US012659354B1

(12) United States Patent　　　(10) Patent No.:　　US 12,659,354 B1
Dunham et al.　　　　　　　　　　(45) Date of Patent:　　　Jun. 16, 2026

(54) POLICY VALIDATION CHECKS

(71) Applicant: Amazon Technologies, Inc., Seattle, WA (US)

(72) Inventors: Jeremiah M. Dunham, Arlington, VA (US); Amit Goel, Portland, OR (US); Mounika Sita Lakshmi Ponnuru, Dublin, CA (US); Leonard Gerard, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 18/615,602

(22) Filed: Mar. 25, 2024

(51) Int. Cl.
　　*H04L 9/40*　　　　　(2022.01)
(52) U.S. Cl.
　　CPC ................................... *H04L 63/20* (2013.01)
(58) Field of Classification Search
　　CPC ...................................................... H04L 63/20
　　See application file for complete search history.

(56) References Cited

U.S. PATENT DOCUMENTS

2008/0046960 A1* 2/2008 Bade ..................... G06F 9/5027
　　　　　　　　　　　　　　　　　　　　726/1
2012/0017260 A1* 1/2012 Narain ................ G06F 21/6209
　　　　　　　　　　　　　　　　　　　　726/1
2013/0174277 A1* 7/2013 Kiukkonen ........... H04L 63/104
　　　　　　　　　　　　　　　　　　　　726/28
2019/0007418 A1* 1/2019 Cook ................... H04N 21/443
2019/0278928 A1* 9/2019 Rungta ............... G06F 9/45533

OTHER PUBLICATIONS

Set up Lambda proxy integrations in API Gateway; https://docs.aws.amazon.com/apigateway/latest/developerguide/set-up-lambda-proxy-integrations.html; Amazon Web Services; indicated as saved by Internet Archive Wayback machine on Mar. 6, 2024; retrieved from https://web.archive.org/web/20240306205921/https://docs.aws.amazon.com/apigateway/latest/developerguide/set-up-lambda-proxy-integrations.html on Mar. 27, 2025; 18 pages.

(Continued)

*Primary Examiner* — Kostas J Katsikis
(74) *Attorney, Agent, or Firm* — BakerHostetler

(57)　　　　　　　　　ABSTRACT

An access management policy and security information indicative of one or more security constraints may be received, by a service, from an entity, such as a customer. The access management policy and the security information may be received in association with a request for the service to perform a policy validation check for validating the policy. The service may perform a permissions comparison that compares a permissiveness of the access management policy to the one or more security constraints to generate a permissions comparison result. The service may generate, based on the permissions comparison result, a binary policy validation check result that may be indicative of either passing or failing the policy validation check. When the access management policy fails the policy validation check, the service may determine a given allow statement within the access management policy that caused the access management policy to fail the policy validation check.

18 Claims, 9 Drawing Sheets

510 Receive, by an access management service, from an entity, a proposed access management policy and security information indicative of one or more security constraints, wherein the proposed access management policy and the security information are received in association with a request for the access management service to perform a policy validation check for validating the proposed access management policy based on the security information 512 Perform, by the access management service, a permissions comparison that compares a permissiveness of the proposed access management policy to the one or more security constraints to generate a permissions comparison result 514 Generating, by the access management service, based on the permissions comparison result, a binary policy validation check result that is either a first result indicating that the proposed access management policy passed the policy validation check or a second result indicating that the proposed access management policy failed the policy validation check 516 Providing, by the access management service, the binary policy validation check result to the entity

(56) References Cited

OTHER PUBLICATIONS

Amazon API Gateway quotas and important notes; https://docs.aws.amazon.com/apigateway/latest/developerquide/limits.html; Amazon Web Services; indicated as saved by Internet Archive Wayback machine on Mar. 6, 2024; retrieved from https://web.archive.org/web/20240306205921/https://docs.aws.amazon.co ateway/latest/developerquide/limits.html on Apr. 18, 2025, 18 pages.

Lamdba quotas; https://docs.aws.amazon.com/lambda/latest/da/gettingstarted-limits.html; Amazon Web Services; indicated as saved by Internet Archive Wayback machine on Mar. 6, 2024; retrieved from https://web.archive.org/web/20240306230132/https://docs.aws.amazon.com/lambda/latest/dg/gettingstarted-limits.html on Apr. 18, 2025; 8 pages.

Gacek, A., How AWS uses automated reasoning to help you achieve security at scale; AWS Security Blog; dated Jun. 20, 2018; retrieved from https://aws.amazon.com/blogs/security/protect-sensitive-data-in-the-cloud-with-automated-reasoning-zelkova/; on Feb. 2, 2024; 9 pages.

Backes et al., Semantic-based Automated Reasoning for AWS Access Policies using SMT, Conference FMCAD, 2018, 9 pages.

GitHub—Netflix/consoleme: A Central Control Plane for AWS Permissions and Access, retrieved from The Wayback Machine at https://web.archive.org/web/20240108043117/https://github.com/Netflix/consoleme dated Jan. 8, 2024, 3 pages.

GitHub—Netflix/consoleme: A Central Control Plane for AWS Permissions and Access, retrieved from https://github. com/Netflix/consoleme, retrieved on Nov. 3, 2025, 5 pages.

GitHub—WithSecureLabs/IAMSpy, retrieved from The Wayback Machine at https://web.archive.org/web/20231214080805/https://github.com/WithSecureLabs/IAMSpy on Dec. 14, 2023, 6 pages.

GitHub—ReversecLabs/IAMSpy, retrieved from https://github.com/ReversecLabs/IAMSpy on Oct. 29, 2025, 4 pages.

* cited by examiner

```
Check No New Access Request 200

Request Syntax 201

{
      "existingPolicyDocument": "string",
      "newPolicyDocument": "string",
      "policyType": "string"
    }

Response Syntax 202

{
      "message": "string",
      "reasons": [
        {
          "description": "string",
          "statementId": "string",
          "statementIndex": number
        }
      ],
      "result": "string"
    }
```

Check Access Not Granted Request 300

Request Syntax 301

```
{
  "access": [
    {
      "actions": [ "string" ]
    }
  ],
  "policyDocument": "string",
  "policyType": "string"
}
```

Response Syntax 302

```
{
  "message": "string",
  "reasons": [
    {
      "description": "string",
      "statementId": "string",
      "statementIndex": number
    }
  ],
  "result": "string"
}
```

FIG. 3

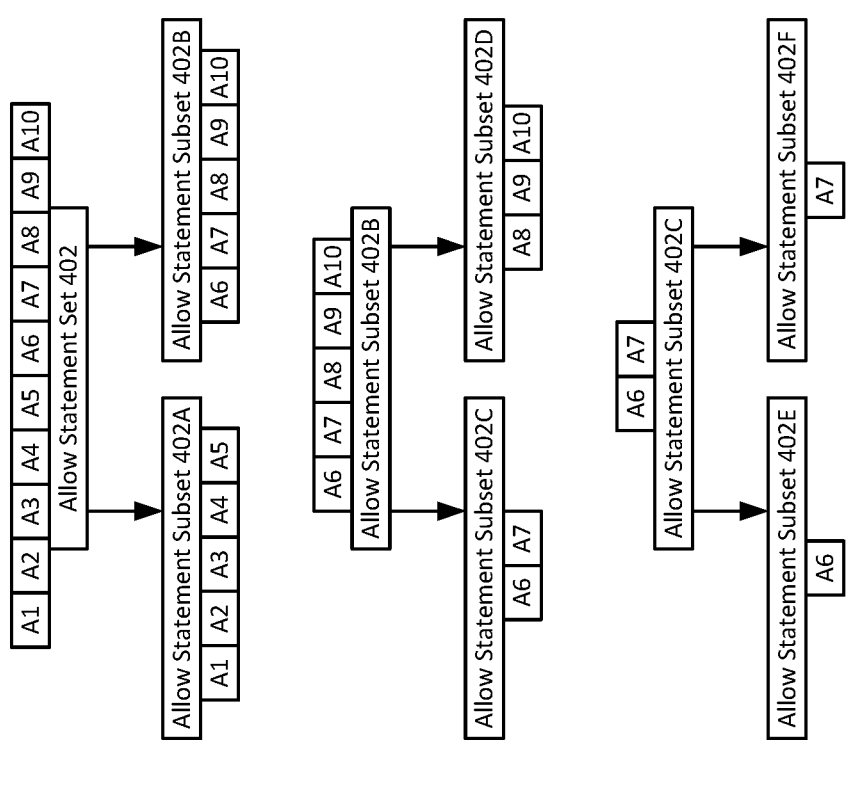
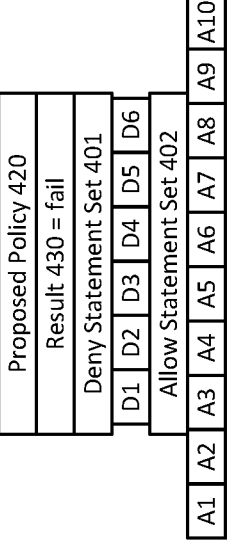
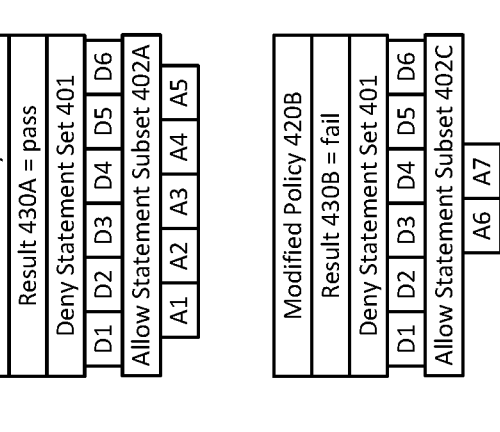
FIG. 4

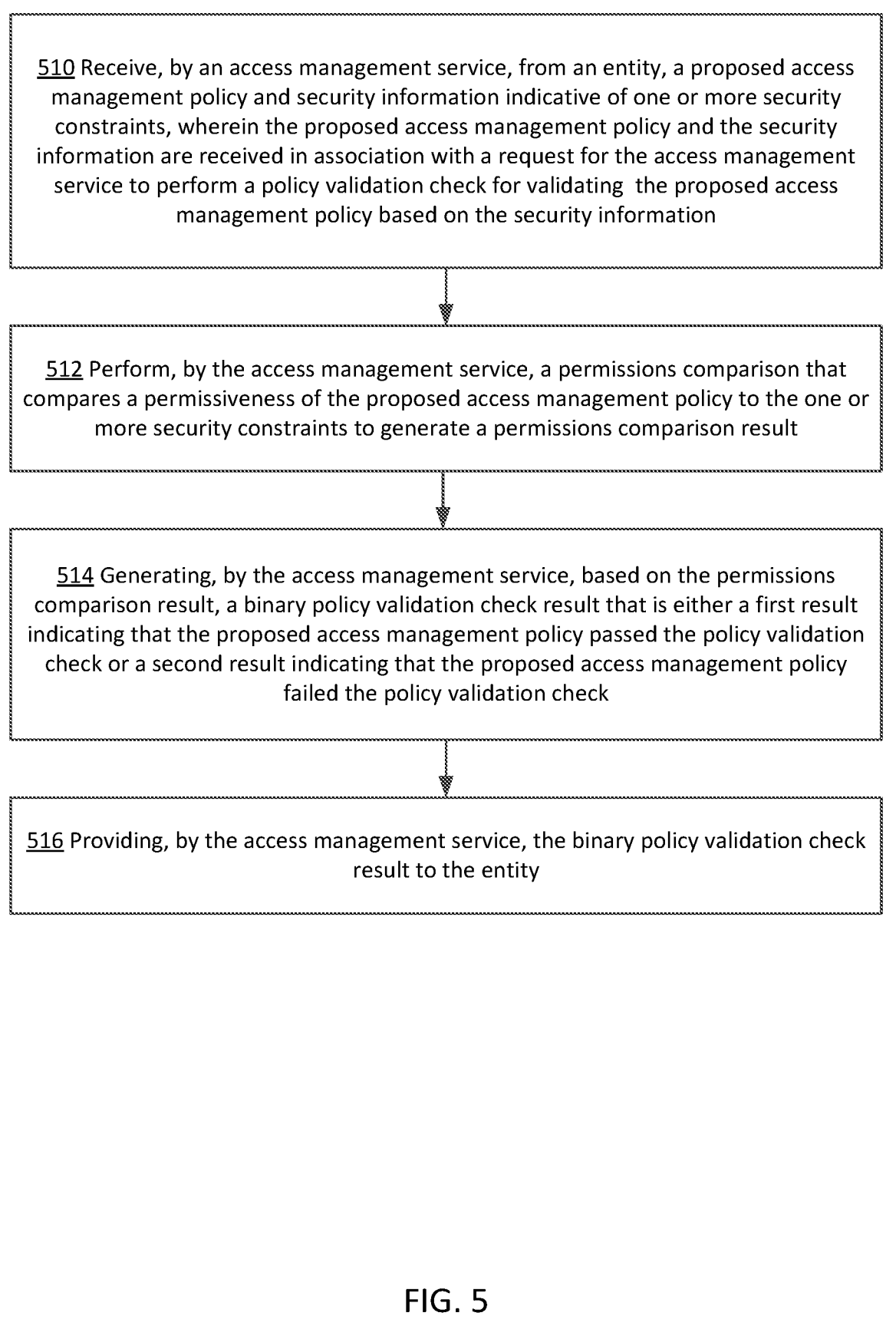

510 Receive, by an access management service, from an entity, a proposed access management policy and security information indicative of one or more security constraints, wherein the proposed access management policy and the security information are received in association with a request for the access management service to perform a policy validation check for validating the proposed access management policy based on the security information 512 Perform, by the access management service, a permissions comparison that compares a permissiveness of the proposed access management policy to the one or more security constraints to generate a permissions comparison result 514 Generating, by the access management service, based on the permissions comparison result, a binary policy validation check result that is either a first result indicating that the proposed access management policy passed the policy validation check or a second result indicating that the proposed access management policy failed the policy validation check 516 Providing, by the access management service, the binary policy validation check result to the entity

FIG. 5

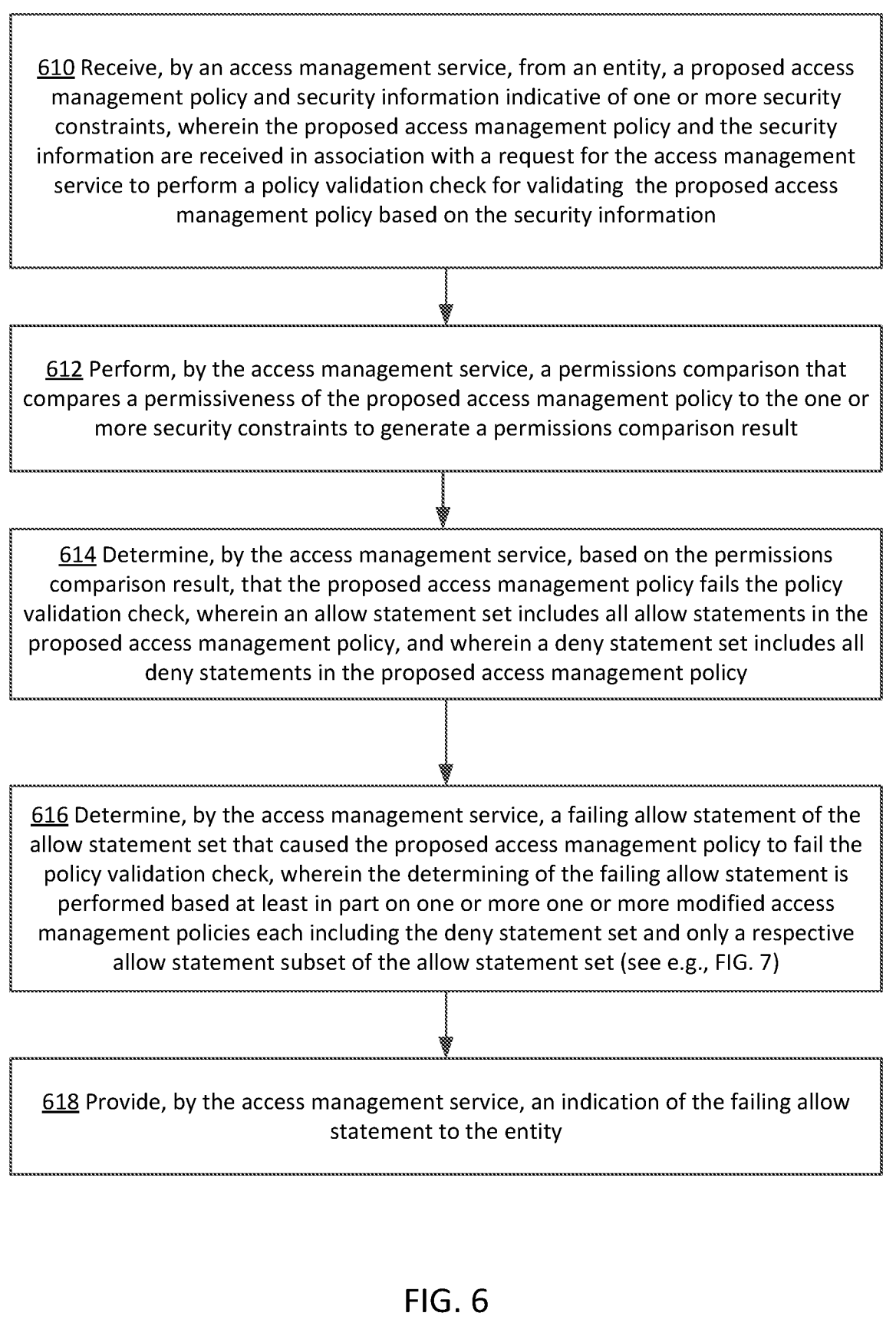

610 Receive, by an access management service, from an entity, a proposed access management policy and security information indicative of one or more security constraints, wherein the proposed access management policy and the security information are received in association with a request for the access management service to perform a policy validation check for validating  the proposed access management policy based on the security information 612 Perform, by the access management service, a permissions comparison that compares a permissiveness of the proposed access management policy to the one or more security constraints to generate a permissions comparison result 614 Determine, by the access management service, based on the permissions comparison result, that the proposed access management policy fails the policy validation check, wherein an allow statement set includes all allow statements in the proposed access management policy, and wherein a deny statement set includes all deny statements in the proposed access management policy 616 Determine, by the access management service, a failing allow statement of the allow statement set that caused the proposed access management policy to fail the policy validation check, wherein the determining of the failing allow statement is performed based at least in part on one or more one or more modified access management policies each including the deny statement set and only a respective allow statement subset of the allow statement set (see e.g., FIG. 7)

618 Provide, by the access management service, an indication of the failing allow statement to the entity

FIG. 6

710 Divide the allow statement set of the proposed access management policy into a plurality of allow statement subsets 712 Perform at least one first additional permissions comparison for at least one of the plurality of allow statement subsets, wherein each of the at least one first additional permissions comparison compares a permissiveness of a respective modified access management policy of the one or more modified access management policies to the one or more security constraints to generate a respective additional permissions comparison result, wherein the respective modified access management policy includes the deny statement set and only a respective allow statement subset included in the plurality of allow statement subsets 714 Determine, based on the respective additional permissions comparison result for each of the at least one first additional permissions comparison, a failing allow statement subset of the plurality of allow statement subsets that includes the failing allow statement

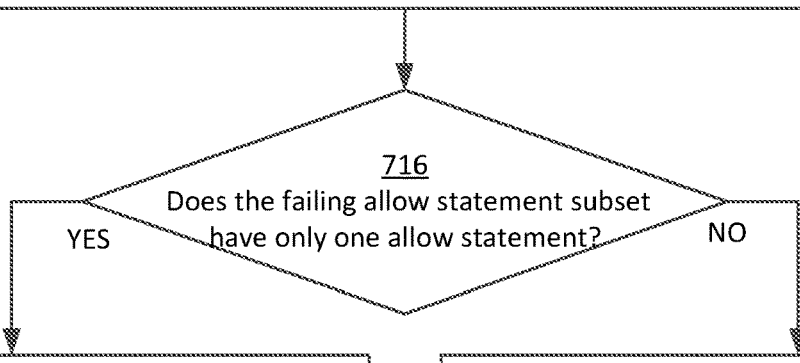

716
Does the failing allow statement subset have only one allow statement?

YES                                    NO

718 Select the only one allow statement as the failing allow statement

720 Subdivide the failing allow statement subset one or more times and perform at least one second additional permissions comparison for the deny statement set and a respective allow statement subset of a respective subdivision until a single allow statement is identified that causes failure of the policy validation check, and select the single allow statement as the failing allow statement

POLICY VALIDATION CHECKS

CROSS-REFERENCE TO RELATED APPLICATIONS

This application is related to the following application, which is hereby incorporated by reference in its entirety: U.S. patent application Ser. No. 18/615,711 filed Mar. 25, 2024, entitled "IDENTIFYING FAILED STATEMENT REASON IN POLICY CHECKS".

BACKGROUND

Organizations may generate security policies to manage security features, such as allocation of permissions to principals (e.g., users, groups, roles, etc.) and management of access to computing resources. In some examples, identity policies may grant permissions to principals, while resource policies may grant permissions on computing resources. A variety of competing concerns may be relevant when organizations generate new policies. On the one hand, it is desirable that policies should not be overly restrictive, such as to deny users permissions that are necessary to do their jobs or to perform other necessary tasks. On the other hand, it is also desirable that policies should not be overly broad, such as by granting unnecessary permissions to users that may pose a security risk. Organizations may often be customers of an access management service, and the organizations may employ the access management service for assistance in relation to management of security features.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a diagram illustrating second example policy validation check request and response formats that may be used in accordance with the present description.

FIG. 4 is a diagram illustrating an example failure causation statement identification technique that may be used in accordance with the present description.

FIG. 5 is a flowchart illustrating an example policy validation check process that may be used in accordance with the present description.

FIG. 6 is a flowchart illustrating an example policy check failure reporting process that may be used in accordance with the present description.

FIG. 7 is a flowchart illustrating an example failure causation statement identification process that may be used in accordance with the present description.

DETAILED DESCRIPTION

Figure 1:
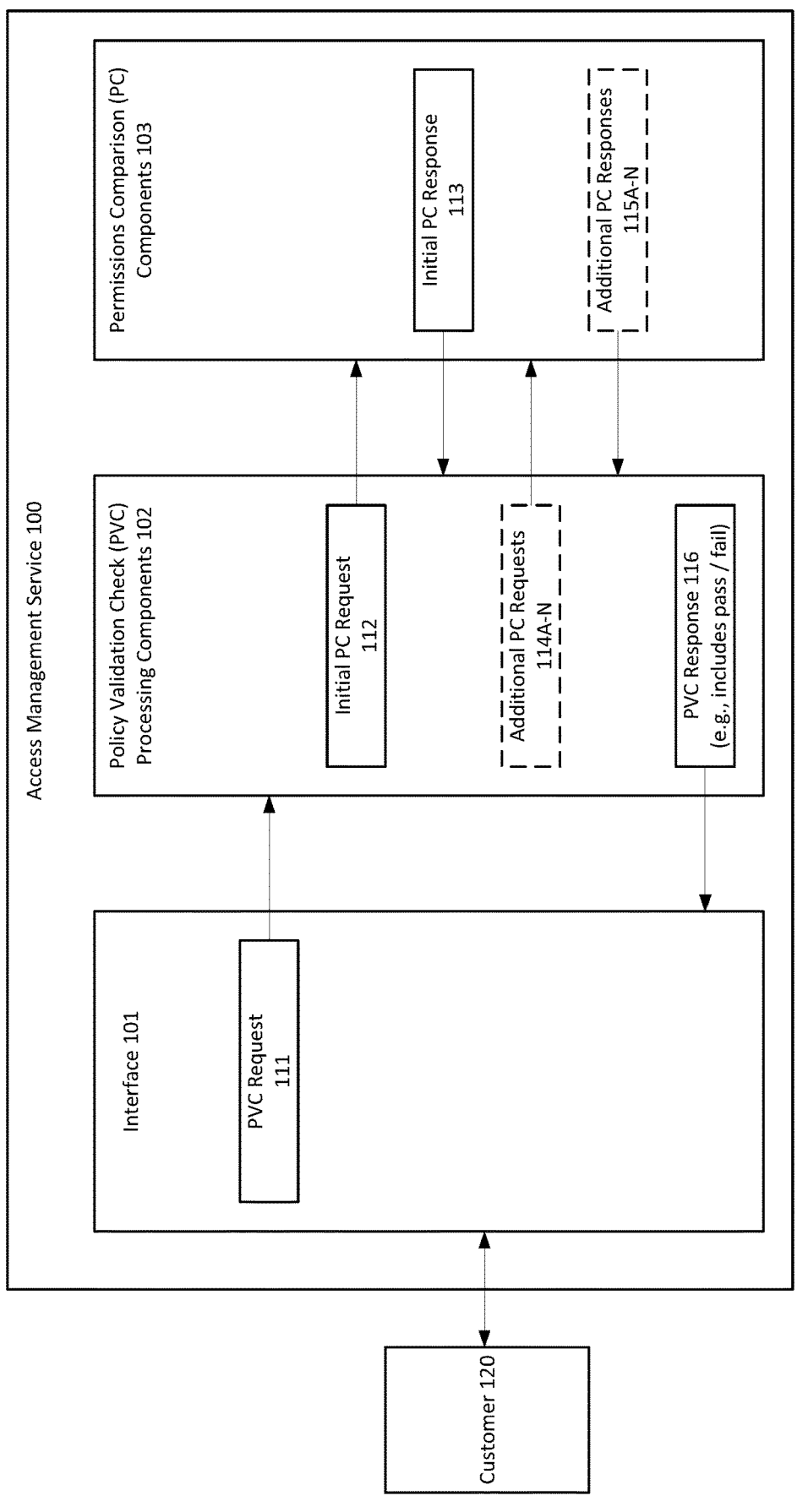
FIG. 1 is a diagram illustrating an example policy validation check system that may be used in accordance with the present description.

Techniques for policy validation checks are described herein. In some examples, the techniques described herein may be performed by an access management service, such as to assist customers of the access management service by validating a proposed access management policy, such as a newly generated policy. Customers of the access management service may frequently generate new access management policies. In some examples, identity policies may grant permissions to principals, while resource policies may grant permissions on computing resources. Prior to deploying a proposed access management policy to production, a customer may wish to confirm that the policy does not grant unwanted access according to customer security standards. According to the techniques described herein, an access management service may allow a customer to request for the access management service to perform a policy validation check for a proposed policy. The policy validation check may be used to validate the proposed access management policy based on security information that is provided by the customer and that is indicative of security constraints.

In order to validate the proposed policy, the access management service may perform a permissions comparison that compares a permissiveness of the proposed access management policy to one or more security constraints indicated by the customer-provided security information. In some examples, the permissions comparison may be performed based on a semantic policy analysis that translates the proposed policy and the security constraints into equivalent logical statements and runs satisfiability modulo theories (SMT) to check properties associated with the equivalent logical statements. The output of the permissions comparison may be a permissions comparison result, such as an indication that the proposed policy is less permissive than the security constraints, an indication that the proposed policy and the security constraints are equally permissive, an indication that the proposed policy is more permissive than the security constraints, an indication that the proposed policy and the security constraints are incomparable, or another result. Based at least in part on the permissions comparison result, the access management service may generate a binary policy validation check result that is either a first result indicating that the proposed access management policy passed the policy validation check (e.g., a pass result) or a second result indicating that the proposed access management policy failed the policy validation check (e.g., a fail result). The access management service may then provide the binary policy validation check result to the customer.

In some examples, the security information provided by the customer may include a reference policy, such as a control policy that grants permissions that are not believed to pose a security threat to the customer. In some cases, the access management service may define a specific request, for example an application programming interface (API) request, that allows a customer to request validation of a proposed policy based on a reference policy, such as to confirm that the proposed policy provides no additional access relative to the reference policy. Accordingly, this request may allow confirmation that the proposed policy does not allow any permissions that are not allowed by the reference policy. In some examples, this request may return a pass result if the proposed policy does not grant any permissions that are not allowed by the reference policy. By contrast, this request may return a fail result if the proposed policy may grant one or more permissions that are not allowed by the reference policy.

Thus, as described above, a customer may sometimes provide a reference policy against which to validate a proposed policy. It is noted, however, that there is no requirement that a customer must provide a reference policy. For example, in some cases, the access management service may define other types of security information that may be provided by the customer and used to validate the proposed policy. For example, in some cases, the customer may simply provide a list of sensitive actions (e.g., actions that may pose a security risk) and request that the service confirm that none of the specified actions are allowed by the proposed policy. In other examples, the customer may provide other parameter values, and the service may confirm that the other parameter values are not violated by the proposed policy. For example, the service may define a request through which the customer may provide a maximum number of principals that are permitted to access a given resource, and the service may confirm that the proposed policy does not allow more than the specified maximum number of principals to access the resource. As another example, the service may define a request that allows the customer to specify a list of resources, and the service may confirm that the proposed policy does not allow access to any of the listed resources. In some examples, the listed resources may include sensitive resources that store sensitive data (e.g., confidential information, financial information, etc.). In some examples, this request may return a pass result if the proposed policy does not allow access to any of the specified resources. By contrast, this request may return a fail result if the proposed policy may allow access to one or more of the specified resources.

In some examples, the security information provided by the customer may include a list of sensitive actions (e.g., actions that may pose a security risk). In some cases, the access management service may define a specific request, for example an API request, that allows a customer to request validation of a proposed policy based on these specified sensitive actions, such as to confirm that the proposed policy does not allow any of the specified sensitive actions. In some examples, this request may return a pass result if the proposed policy does not allow any of the specified sensitive actions. By contrast, this request may return a fail result if the proposed policy may allow one or more of the specified sensitive actions.

It is noted that, in some examples, deep expertise in both formal logic and a given policy language may sometimes be required to successfully use a semantic policy analysis tool. By contrast, the policy validation requests described above may allow customers to provide policy validation parameters without requiring deep expertise in formal logic or a given policy language. Moreover, by providing a binary check result, such as a pass or fail result, the policy checks herein may provide, to a customer, validation results in an intuitive manner that directly corresponds to the validation inquiry desired by the customer.

When a proposed policy fails a policy validation check, the access management service may identify a particular statement in the proposed policy that caused the policy to fail the validation check and provide an indication of this statement back to the customer. This may be helpful to the customer, such as by pinpointing the cause of the failure, and thereby allowing the customer to quickly delete or modify the statement that caused the failure. In some examples, after determining that a policy has failed a validation check, the service may identify the statement that caused the failure by dividing the allow statements in the policy and repeating the policy validation check with a modified policy that includes all deny statements but only a subset of allow statements in the initial proposed policy until a single failing allow statement is identified. In one specific example, the allow statements may be repeatedly divided into two equally sized groups, or approximately equally sized groups. For example, consider a scenario in which a failing policy has ten allow statements and ten deny statements. In this scenario, after the policy fails the validation check, the ten allow statements in the policy may be divided into two groups of five allow statements. The validation may then be repeated for a first modified policy including all ten deny statements and only the first group of five allow statements. If the first modified policy fails the validation check, then the first group of five allow statements may be subdivided into a first group of three allow statements and a second group of two allow statements, and the same technique may be repeated until a single failing allow statement is identified. By contrast, if the first modified policy passes the validation check, then the statement that caused the policy to fail is included within the second group of five allow statements. Thus, the second group of five allow statements may be subdivided into a first group of three allow statements and a second group of two allow statements, and the same technique may be repeated until a single failing allow statement is identified. In some other examples, instead of dividing the allow statements into only two groups at a time, the allow statements may be divided into more than two groups, and the validation checks of the groups may be performed concurrently (e.g., in parallel). For example, ten allow statements may be divided into five groups of two allow statements, and the validation checks may be performed on all five groups concurrently. Dividing into more than two groups that are checked concurrently may allow a faster determination of the statement that caused the failure, while using only two groups may reduce request traffic and volume by finding the statement that caused the failure with fewer calls to the permissions comparison components.

FIG. 1 is a diagram illustrating an example policy validation check system that may be used in accordance with the present description. In the example of FIG. 1, access management service 100 may perform a policy validation check on behalf of customer 120 of the access management service 100 to validate a proposed access management policy. For example, prior to deploying a proposed policy to production, customer 120 may wish to confirm that the policy does not grant unwanted access according to security standards of the customer 120. A policy validation check, as that term is used herein, refers to a check that confirms that a policy is not more permissive than security constraints that are indicated by security information, such as may be provided by customer 120. As described in detail below, a policy may pass a policy validation check when it is established based on a permissions comparison that the policy is not more permissive than the security constraints. By contrast, the policy may fail the policy validation check when it is established that the policy is more permissive than the security constraints or when it is uncertain whether the policy is more permissive than the security constraints. Thus, a policy may be validated when it passes a policy validation check, and a policy validation check may therefore be for validating a respective policy. To request a policy validation check for a proposed access management policy, the customer 120 may submit a policy validation check (PVC) request 111 to access management service 100 via interface 101. The PVC request 111 may be used to validate the proposed access management policy based on security information that is provided by the customer 120 and that is indicative of security constraints. In some examples, interface 101 may be an API provided by access management service 100. Thus, PVC request 111 may be an API request. In some other examples, interface 101 may be another interface provided by access management service, such as a command line interface (CLI).

The PVC request 111 may include the proposed policy that is being validated. Additionally, the PVC request 111 may include security information that is used to validate the proposed policy. In some examples, the security information included in the PVC request 111 may be a reference policy, such as a control policy that grants permissions that are not believed to pose a security threat to the customer 120. In these examples, the PVC request 111 may be a request to confirm that the proposed policy does not grant any access that is not allowed by the reference policy. In some other examples, the security information included in the PVC request 111 may be a list of sensitive actions, such as actions that may pose a security risk to customer 120. In these examples, the PVC request 111 may be a request to confirm that the proposed policy does not allow any of the specified sensitive actions. In other examples, the security information included in the PVC request 111 may include other parameter values, such as a maximum number of principals that are permitted to access a given resource. In these examples, the PVC request 111 may be a request to confirm that the proposed policy does not allow more than the maximum number of principals to access the given resource. In yet other examples, the security information included in the PVC request 111 may include indications of resources, such as sensitive resources that store sensitive data (e.g., confidential information, financial information, etc.). In these examples, the PVC request 111 may be a request to confirm that the proposed policy does not allow access to any of the indicated sensitive resources.

The PVC request 111 may be received by PVC processing components 102, which may validate and process the PVC request 111 and generate and return a PVC response 116. Upon receiving the PVC request 111, the PVC processing components 102 may validate the PVC request 111, such as to ensure that it is a valid request from an authorized user that is submitted in the proper format and that includes all necessary information for processing. If the PVC request 111 is invalid, then an error message may be returned. If the PVC request 111 is valid, then the PVC processing components 102 may generate an initial permissions comparison (PC) request 112 based on the PVC request 111. Specifically, as part of validating the proposed policy, the access management service 100 may perform a permissions comparison that compares a permissiveness of the proposed access management policy to one or more security constraints that are indicated by the security information included in the PVC request 111. Thus, the initial PC request 112 may be a request for the PC components 103 to compare a permissiveness of the proposed policy to the security constraints. Accordingly, the initial PC request 112 may include both the proposed policy and the security constraints. In some examples, the security constraints included in the initial PC request 112 may be the same as the security information included in the PVC request 111. For example, for requests to validate a proposed policy based on a reference policy, both the security information included in the PVC request 111 and the security constraints included in the initial PC request 112 may include the reference policy. By contrast, in some examples, the security constraints included in the initial PC request 112 may include information that is generated based on the security information included in the PVC request 111. For example, in some cases, when the security information included in the PVC request 111 includes a list of sensitive actions, the security constraints included in the initial PC request may include a reference policy that is generated by the PVC processing components 102 based on the list of sensitive actions and that allows actions other than the listed sensitive actions. As yet another example, when the security information included in the PVC request 111 includes a list of sensitive resources, the security constraints included in the initial PC request may include a reference policy that is generated by the PVC processing components 102 based on the list of sensitive resources and that allows access to resources other than the listed sensitive resources.

Thus, the initial PC request 112 may be a request for the PC components 103 to compare the proposed policy to security constraints indicated by the security information in the PVC request 111. Upon receipt of the initial PC request 112, the PC components 103 may perform a permissions comparison that compares a permissiveness of the proposed policy to the security constraints to generate a permissions comparison result, which is initial PC response 113. In some examples, the PC components 103 may perform the permissions comparison based on a semantic policy analysis that translates the proposed policy and the security constraints included in the initial PC request 112 into equivalent logical statements and runs a suite of general-purpose and specialized logical solvers against the problem. The specialized logical solvers employed by the PC components 103 may include satisfiability modulo theories (SMT) solvers that use a mix of numbers, strings, regular expressions, dates, IP addresses and/or other information to prove and disprove logical formulas.

The PC components 103 may generate an initial PC response 113 that includes a result of the permissions comparison between the proposed policy and the security constraints. In some examples, the initial PC response 113 may include any of a variety of values that indicate a result of the comparison between the proposed policy and the security constraints. Some example values that may be included in the initial PC response 113 are less permissive, equally permissive, more permissive, and incomparable. For example, a less permissive result may indicate that the proposed policy is less permissive than the security constraints. An equally permissive result may indicate that the proposed policy is equally permissive as the security constraints. A more permissive result may indicate that the proposed policy is more permissive than the security constraints. An incomparable result may indicate that the proposed policy cannot be properly compared to the security constraints. In some examples, other types of results may additionally or alternatively be included in the initial PC response 113.

As shown in FIG. 1, additional PC requests 114A-N may also optionally be submitted by PVC processing components 102, and additional PC responses 115A-N may be returned by PC components 103. Additional PC requests 114A-N and additional PC responses 115A-N may be used to identify a statement within the policy that causes a policy to fail a policy validation check. Thus, additional PC requests 114A-N and additional PC responses 115A-N are shown with dashed lines in FIG. 1 to indicate that they may be performed in the case of a failed policy validation check. The use of additional PC requests 114A-N and additional PC responses 115A-N to identify a statement within the proposed policy that causes the proposed policy to fail a policy validation check is described in detail below with reference to FIGS. 4 and 5.

As also shown in FIG. 1, the PC response 113 may be received by PVC processing components 102. Based on at least in part on the initial PC response 113, the PVC processing components 102 may generate a PVC response 116. The PVC response 116 may include a binary policy validation check result that is either a first result indicating that the proposed access management policy passed the policy validation check (e.g., a pass result) or a second result indicating that the proposed access management policy failed the policy validation check (e.g., a fail result). The access management service may then provide the PVC response 116 to the customer 120 via interface 101. In some examples, the binary policy validation check result may be a pass result only when the initial PC response 113 indicates that the proposed policy is less permissive than, or equally permissive as, the security constraints. Thus, for all other potential values of the initial PC response 113 (e.g., more permissive, incomparable, etc.), the binary policy validation check result may be a fail result. This is because the proposed policy should pass the validation check only when it can be established that the proposed policy is not more permissive than the security constraints. If the proposed policy is more permissive than the security constraints, or if it is uncertain whether the proposed policy is more permissive than the security constraints (e.g., if the comparison result is incomparable or an error result), then the proposed policy may fail the validation check.

Figure 2:
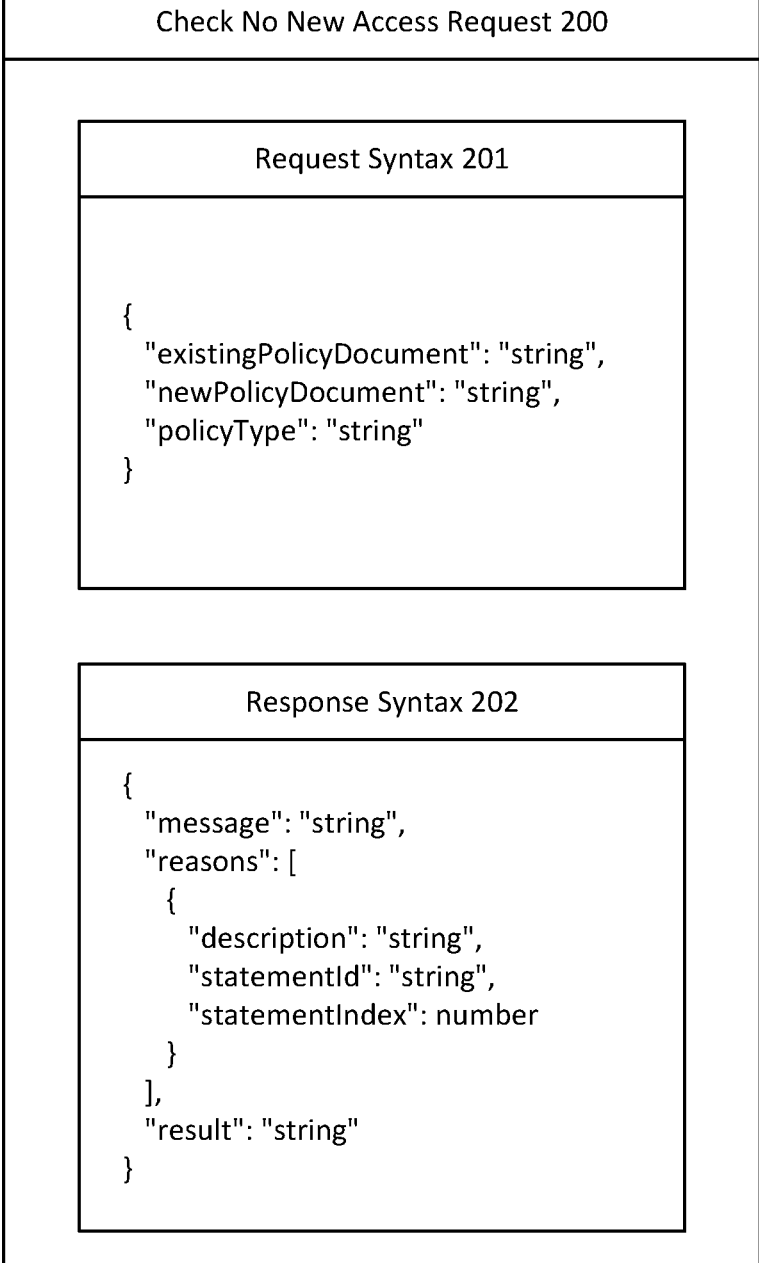
FIG. 2 is a diagram illustrating first example policy validation check request and response formats that may be used in accordance with the present description.

Referring now to FIG. 2, Check No New Access Request 200 is a first specific example of PVC request 111. In particular, Check No New Access Request 200 may be used to request a policy validation check of a proposed policy based on a reference policy, such as a control policy that grants permissions that are not believed to pose a security threat to the customer 120. Specifically, Check No New Access Request 200 may be used to confirm that the proposed policy does not grant any access that is not allowed by the reference policy. In some examples, Check No New Access Request 200 may be an API request. As shown, Check No New Access Request 200 may have a request syntax 201 and response syntax 202. The request syntax 201 and response syntax 202 may be defined by the access management service 100 and exposed to customer 120, for example via corresponding documentation (e.g., displayed via websites, user guides, etc.). In this example, the request syntax 201 includes a string (referred to in FIG. 2 as "existingPolicyDocument") for entry of the contents of the reference policy. The request syntax 201 also includes a string (referred to in FIG. 2 as "newPolicyDocument") for entry of the contents of the proposed policy that is being validated. The request syntax 201 also includes a string (referred to in FIG. 2 as "policyType") for entry of an indication of the types of policies that are being compared (e.g., identity policies or resource policies). The response syntax 202 includes a string (referred to in FIG. 2 as "message") that indicates whether the updated policy allows new access. The response syntax 202 includes an array (referred to in FIG. 2 as "reasons") that includes information about the reasoning why a check for access passed or failed. In this example, the reasons array includes a "description" string that indicates a description of the reasoning of a result of checking for access. The reasons array includes a "statementId" string that includes an identifier for the reason statement. The reasons array includes a "statementIndex" number that includes the index number of the reason statement. For example, if the proposed policy fails the policy validation check, then the "statementId" string may include an identifier for a statement within the proposed policy that caused the policy to fail the validation check. Additionally, the "statementIndex" number may include the index number for the statement within the proposed policy that caused the policy to fail the validation check. The response syntax 202 also includes a string (referred to in FIG. 2 as "result") that provides the result of the policy validation check. As described above, the result may be a binary result that indicates either pass or fail. If the result is pass, no new access is allowed by the updated policy. If the result is fail, the updated policy may allow new access.

Referring now to FIG. 3, Check Access Not Granted Request 300 is a second specific example of PVC request 111. In particular, Check Access Not Granted Request 300 may be used to request a policy validation check of a proposed policy based on list of sensitive actions, such as actions that may pose a security risk to customer 120. Specifically, Check Access Not Granted Request 300 may be used to confirm that the proposed policy does not allow any of the specified sensitive actions. In some examples, Check Access Not Granted Request 300 may be an API request. As shown, Check Access Not Granted Request 300 may have a request syntax 301 and response syntax 302. The request syntax 301 and response syntax 302 may be defined by the access management service 100 and exposed to customer 120, for example via corresponding documentation (e.g., displayed via websites, user guides, etc.). In this example, the request syntax 301 includes an array (referred to in FIG. 3 as "access") for entry of the list of sensitive actions. Specifically, the access array includes a number of "action" strings that each identify a respective specified sensitive action. The request syntax 301 also includes a string (referred to in FIG. 3 as "policyDocument") for entry of the contents of the proposed policy that is being validated. The request syntax 301 also includes a string (referred to in FIG. 3 as "policyType") for entry of an indication of the type of policy that is being validated (e.g., an identity policy or a resource policy). The response syntax 302 includes a string (referred to in FIG. 3 as "message") that indicates whether any of the specified actions are allowed by the proposed policy. The response syntax 302 includes an array (referred to in FIG. 3 as "reasons") that includes information about the reasoning why a check for access passed or failed. In this example, the reasons array includes a "description" string that indicates a description of the reasoning of a result of checking for access. The reasons array includes a "statementId" string that includes an identifier for the reason statement. The reasons array includes a "statementIndex" number that includes the index number of the reason statement. For example, if the proposed policy fails the policy validation check, then the "statementId" string may include an identifier for a statement within the proposed policy that caused the policy to fail the validation check. Additionally, the "statementIndex" number may include the index number for the statement within the proposed policy that caused the policy to fail the validation check. For example, if the proposed policy fails the policy validation check, then the "statementId" string may include an identifier for a statement within the proposed policy that caused the policy to fail the validation check. The response syntax 302 also includes a string (referred to in FIG. 3 as "result") that provides the result of the policy validation check. As described above, the result may be a binary result that indicates either pass or fail. If the result is pass, none of the specified sensitive actions are allowed by the updated policy. If the result is fail, one or more of the specified sensitive actions may be allowed by the updated policy. As another example, for scenarios in which the customer 120 provides a list of resources (e.g., resources that store sensitive data), the binary result may be a pass result when the proposed policy does not allow access to any of the specified resources. By contrast, the binary result may be a fail result when the proposed policy may allow access to one or more of the specified resources.

In some examples, when a proposed policy fails a policy validation check, the access management service 100 may identify a particular statement in the proposed policy that caused the policy to fail the validation check and provide an indication of this statement back to the customer 120. This may be helpful to the customer 120, such as by pinpointing the cause of the failure, and thereby allowing the customer 120 to quickly delete or modify the statement that caused the failure. In some examples, after determining that a policy has failed a validation check, the access management service 100 may identify the statement that caused the failure by dividing the allow statements in the policy and repeating the policy validation check with a modified policy that includes all deny statements but only a subset of allow statements in the initial proposed policy until a single failing allow statement is identified.

In one specific example, the allow statements in the proposed policy may be repeatedly divided into two equally sized groups, or approximately equally sized groups. Referring now to FIG. 4, an example of this technique will now be described in detail. In the example of FIG. 4, a proposed policy 420 includes a deny statement set 401 and an allow statement set 402. The deny statement set 401 includes deny statements D1-D6. The allow statement set 402 includes allow statements A1-A10. Thus, the PVC processing components 102 may submit an initial PC request 112 that causes the PC components 103 to compare the proposed policy 420 (including deny statements D1-D6 and allow statements A1-A10) to the relevant security constraints. In this example, the proposed policy 420 has failed a policy validation check, as shown by result 430. Because proposed policy 420 has failed the policy validation check, the access management service 100 may identify a statement in the proposed policy 420 that caused the proposed policy 420 to fail the policy validation check.

To identify the statement that caused the failure, the allow statement set 402 may first be divided into allow statement subsets 402A-B. As shown on the right side of FIG. 4, allow statement set 402 (which includes ten allow statements A1-A10) is divided into allow statement subset 402A (including five allow statements A1-A5) and allow statement subset 402B (also including five allow statements A6-A10). A modified policy 420A is then formed, which includes all of the deny statements D1-D6 in the deny statement set 401 but that includes only the allow statements A1-A5 in the allow statement subset 402A. An additional PC request (e.g., one of PC requests 114A-N of FIG. 1) may then be issued by the PVC processing components 102 to cause the PC components 103 to compare the modified policy 420A (including deny statements D1-D6 and allow statements A1-A5) to the same security constraints to which the proposed policy 420 was compared.

In this example, the modified policy 420A passes the policy validation check, as shown by result 430A. This means that the additional permissions comparison result indicates that the modified policy 420A is not more permissive than the security constraints. Because the modified policy 420A passes the policy validation check, it may be concluded that the statement that caused the proposed policy

420 to fail the policy validation check is not one of allow statements A1-A5. Based on this, it may also be concluded that the statement that caused the proposed policy 420 to fail the policy validation check must be one of allow statements A6-A10, which are included in allow statement subset 402B. In view of this, the allow statement subset 402B may be subdivided into allow statement subsets 402C-D. As shown on the right side of FIG. 4, allow statement subset 402B (which includes five allow statements A6-A10) is divided into allow statement subset 402C (including two allow statements A6-A7) and allow statement subset 402D (including three allow statements A8-A10). A modified policy 420B is then formed, which includes all of the deny statements D1-D6 in the deny statement set 401 but that includes only the allow statements A6-A7 in the allow statement subset 402C. An additional PC request (e.g., one of PC requests 114A-N of FIG. 1) may then be issued by the PVC processing components 102 to cause the PC components 103 to compare the modified policy 420B (including deny statements D1-D6 and allow statements A6-A7) to the same security constraints to which the proposed policy 420 was compared.

In this example, the modified policy 420B fails the policy validation check, as shown by result 430B. This means that the additional permissions comparison result indicates that the modified policy 420B is more permissive than the security constraints—or that the result is uncertain (e.g., incomparable, error result, etc.). Because the modified policy 420B fails the policy validation check, it may be concluded that the statement that caused the proposed policy 420 to fail the policy validation check is within allow statement subset 402C. It is noted, however, that allow statement subset 402C includes more than one allow statement. In view of this, the allow statement subset 402C may be subdivided into allow statement subsets 402E-F. As shown on the right side of FIG. 4, allow statement subset 402C (which includes two allow statements A6-A7) is divided into allow statement subset 402E (including allow statement A6) and allow statement subset 402F (including allow statement A7). A modified policy 420C is then formed, which includes all of the deny statements D1-D6 in the deny statement set 401 but that includes only the allow statement A6 in the allow statement subset 402E. An additional PC request (e.g., one of PC requests 114A-N of FIG. 1) may then be issued by the PVC processing components 102 to cause the PC components 103 to compare the modified policy 420C (including deny statements D1-D6 and allow statement A6) to the same security constraints to which the proposed policy 420 was compared. In this example, the modified policy 420C fails the policy validation check, as shown by result 430C. Because the modified policy 420C fails the policy validation check, it may be concluded that the statement that caused the proposed policy 420 is within allow statement subset 402E. Additionally, because allow statement subset 402E includes only a single allow statement (allow statement A6), it may be concluded that allow statement A6 is the failing allow statement that caused the proposed policy to fail the policy validation check.

In some other examples, instead of dividing the allow statements into only two subsets at a time, the allow statements may be divided into more than two subsets, and the validation checks of the subsets may be performed concurrently. For example, ten allow statements may be divided into five subsets of two allow statements, and the validation checks may be performed on all five subsets concurrently. Dividing into more than two subsets that are checked concurrently may allow a faster determination of the statement that caused the failure, while using only two subsets may reduce request traffic and volume by finding the statement that caused the failure with fewer calls to the PC components 103. Also, in some examples, it is noted there may be more than one statement that causes a proposed policy to fail a policy validation check. In some examples, an indication of only one of these failing statements may be returned to the customer. By contrast, in some other examples, indications of all of the failing statements may be returned to the customer.

FIG. 5 is a flowchart illustrating an example policy validation check process that may be used in accordance with the present description. A proposed policy, as that term is used herein, refers to a policy on which a policy validation check is performed. At operation 510, an access management service receives, from an entity, a proposed access management policy and security information indicative of one or more security constraints, wherein the proposed access management policy and the security information are received in association with a request for the access management service to perform a policy validation check for validating the proposed access management policy based on the security information. An entity, as that term is used herein, refers to a person, group, organization and/or computing component or components capable of providing information. In some examples, the entity may be a customer 120 of the access management service 100 and/or one or more users associated with the customer 120. Thus, in some examples, the request to perform the policy validation check may be a customer request. However, the entity need not necessarily be associated with the customer 120. Also, in some examples, the entity may be one or more computing components, for example operated by customer 120 or another organization. As described above with reference to FIG. 1, access management service 100 may perform a policy validation check on behalf of customer 120 of the access management service 100 to validate a proposed access management policy. In some cases, prior to deploying a proposed policy to production, customer 120 may wish to confirm that the policy does not grant unwanted access according to security standards of the customer 120. A policy validation check, as that term is used herein, refers to a check for confirming that a policy is not more permissive than security constraints that are indicated by security information, such as may be provided by customer 120. A policy may pass a policy validation check when it is established based on a permissions comparison that the policy is not more permissive than the security constraints. By contrast, the policy may fail the policy validation check when it is established that the policy is more permissive than the security constraints or when it is uncertain whether the policy is more permissive than the security constraints. To request a policy validation check for a proposed access management policy, the customer 120 may submit a policy validation check (PVC) request 111 to access management service 100 via interface 101. The PVC request 111 may be used to validate the proposed access management policy based on security information that is provided by the customer 120 and that is indicative of security constraints. In some examples, interface 101 may be an API provided by access management service 100. Thus, PVC request 111 may be an API request. In some other examples, interface 101 may be another interface provided by access management service, such as a command line interface (CLI). Request syntax 201 of FIG. 2 and request syntax 301 of FIG. 3, which are described in detail above, are two examples of syntaxes for the PVC request 111.

As also described above, the PVC request 111 may include the proposed policy that is being validated. Additionally, the PVC request 111 may include security information that is used to validate the proposed policy. In some examples, the security information included in the PVC request 111 may include a reference policy, such as a control policy that grants permissions that are not believed to pose a security threat to the customer 120. In these examples, the PVC request 111 may be a request to confirm that the proposed policy does not grant any access that is not allowed by the reference policy. In some other examples, the security information included in the PVC request 111 may include indications of sensitive actions, such as actions that may pose a security risk to customer 120. In these examples, the PVC request 111 may be a request to confirm that the proposed policy does not allow any of the specified sensitive actions. In other examples, the security information included in the PVC request 111 may include other parameter values, such as a maximum quantity of principals that are permitted to access a given resource. In yet other examples, the security information included in the PVC request 111 may include indications of resources, such as sensitive resources that store sensitive data (e.g., confidential information, financial information, etc.). Thus, in some examples, the security information may include at least one of a reference policy, a list of actions that pose a security risk to the customer, a list of resources, or a maximum quantity of principals that are permitted to access a resource.

At operation 512, the access management service may perform a permissions comparison that compares a permissiveness of the proposed access management policy to the one or more security constraints to generate a permissions comparison result. The permissions comparison may be performed based on a semantic policy analysis that translates the proposed access management policy and the security constraints into equivalent logical statements and runs satisfiability modulo theories (SMT) to check properties associated with the equivalent logical statements. For example, as described above with reference to FIG. 1, the PVC processing components 102 may generate an initial permissions comparison (PC) request 112 based on the PVC request 111. Specifically, as part of validating the proposed policy, the access management service 100 may perform a permissions comparison that compares a permissiveness of the proposed access management policy to one or more security constraints that are indicated by the security information included in the PVC request 111. Thus, the initial PC request 112 may be a request for the PC components 103 to compare a permissiveness of the proposed policy to the security constraints. Accordingly, the initial PC request 112 may include both the proposed policy and the security constraints.

In some examples, the security constraints included in the initial PC request 112 may be the same as the security information included in the PVC request 111. For example, for requests to validate a proposed policy based on a reference policy, both the security information included in the PVC request 111 and the security constraints included in the initial PC request 112 may include the reference policy. By contrast, in some examples, the security constraints included in the initial PC request 112 may include information that is generated based on the security information included in the PVC request 111. For example, in some cases, when the security information included in the PVC request 111 includes a list of sensitive actions, the security constraints included in the initial PC request may include a reference policy that is generated by the PVC processing components 102 based on the list of sensitive actions and that allows actions other than the listed sensitive actions. Thus, in some examples, the PVC processing components 102 may automatically generate a reference policy based on the indications of the actions, wherein the one or more security constraints comprise the reference policy. For example, in some cases, the PVC processing components 102 may generate a reference policy that allows all actions except for the actions that are included in the list of sensitive actions provided by the customer 120. As another example, for scenarios in which a customer specifies a maximum quantity of principals that are permitted to access a given resource, a reference policy may be automatically generated that permits only the specified quantity of principals to access the given resource. As yet another example, for scenarios in which a customer specifies a list of sensitive resources, a reference policy may be automatically generated that allows access to resources other than the specified sensitive resources.

Thus, the initial PC request 112 may be a request for the PC components 103 to compare the proposed policy to security constraints indicated by the security information in the PVC request 111. Upon receipt of the initial PC request 112, the PC components 103 may perform a permissions comparison that compares a permissiveness of the proposed policy to the security constraints to generate a permissions comparison result, which is initial PC response 113. In some examples, the PC components 103 may perform the permissions comparison based on a semantic policy analysis that translates the proposed policy and the security constraints included in the initial PC request 112 into equivalent logical statements and runs a suite of general-purpose and specialized logical solvers against the problem. The specialized logical solvers employed by the PC components 103 may include satisfiability modulo theories (SMT) solvers that use a mix of numbers, strings, regular expressions, dates, IP addresses and/or other information to prove and disprove logical formulas. The PC components 103 may generate an initial PC response 113 that includes a result of the permissions comparison between the proposed policy and the security constraints.

At operation 514, the access management service generates, based on the permissions comparison result, a binary policy validation check result that is either a first result indicating that the proposed access management policy passed the policy validation check or a second result indicating that the proposed access management policy failed the policy validation check. As also shown in FIG. 1, based on at least in part on the initial PC response 113, the PVC processing components 102 may generate a PVC response 116. The PVC response 116 may include a binary policy validation check result that is either a first result indicating that the proposed access management policy passed the policy validation check (e.g., a pass result) or a second result indicating that the proposed access management policy failed the policy validation check (e.g., a fail result). The access management service may then provide the PVC response 116 to the customer 120 via interface 101. In some examples, the binary policy validation check result may be a pass result only when the initial PC response 113 indicates that the proposed policy is less permissive than, or equally permissive as, the security constraints. Thus, for all other potential values of the initial PC response 113 (e.g., more permissive, incomparable, etc.), the binary policy validation check result may be a fail result. This is because the proposed policy should pass the validation check only when it can be established that the proposed policy is not more permissive than the security constraints. If the proposed policy is more permissive than the security constraints, or if it is uncertain whether the proposed policy is more permissive than the security constraints (e.g., if the comparison result is incomparable or an error result), then the proposed policy may fail the validation check. Thus, in some examples, the first result indicating that the proposed access management policy passed the policy validation check may be generated based on the permissions comparison result indicating that the proposed access management policy is less permissive than the one or more security constraints or indicating that the proposed access management policy and the one or more security constraints are equally permissive. Also, in some examples, the second result indicating that the proposed access management policy failed the policy validation check may be generated based on the permissions comparison result indicating that the proposed access management policy is more permissive than the one or more security constraints. Furthermore, in some examples, the second result indicating that the proposed access management policy failed the policy validation check may be generated based on the permissions comparison result indicating that the proposed access management policy and the one or more security constraints are incomparable.

At operation 516, the access management service provides the binary policy validation check result to the entity. As described above, the binary policy validation check result may be included in PVC response 116 of FIG. 1. Some example formats for PVC response 116 are response syntax 202 and response syntax 302, which are described above with reference to FIGS. 2 and 3. For example, the binary policy validation check result may be included in the "result" string of response syntax 202 and response syntax 302. As described below with reference to FIG. 6, for scenarios in which the proposed policy fails the policy validation check, an indication of a statement that caused the failure may also be included in the PVC response 116. Additionally, some example techniques for identifying the statement that caused the failure are described herein with references to FIG. 4 and FIG. 7.

FIG. 6 is a flowchart illustrating an example policy check failure reporting process that may be used in accordance with the present description. Operations 610 and 612 of FIG. 6 are identical to operations 510 and 512 of FIG. 5. Thus, the descriptions of operations 510 and 512 may apply to operations 610 and 612 without being repeated here. At operation 614, the access management service determines, based on the first permissions comparison result, that the proposed access management policy fails the policy validation check, wherein an allow statement set includes all allow statements in the proposed access management policy, and wherein a deny statement set includes all deny statements in the proposed access management policy. As described above with reference to FIG. 1, based on at least in part on the initial PC response 113, the PVC processing components 102 may determine a binary policy validation check result that is either a first result indicating that the proposed access management policy passed the policy validation check (e.g., a pass result) or a second result indicating that the proposed access management policy failed the policy validation check (e.g., a fail result). In some examples, the binary policy validation check result may be a pass result only when the initial PC response 113 indicates that the proposed policy is less permissive than, or equally permissive as, the security constraints. Thus, for all other potential values of the initial PC response 113 (e.g., more permissive, incomparable, etc.), the binary policy validation check result may be a fail result.

This is because the proposed policy should pass the validation check only when it can be established that the proposed policy is not more permissive than the security constraints. If the proposed policy is more permissive than the security constraints, or if it is uncertain whether the proposed policy is more permissive than the security constraints (e.g., if the comparison result is incomparable or an error result), then the proposed policy may fail the validation check. Thus, in some examples, it may be determined that the proposed policy fails the policy validation check when the first permissions comparison result (e.g., the initial PC response 113) indicates that the proposed policy is more permissive than the security constraints, or if it is uncertain whether the proposed policy is more permissive than the security constraints (e.g., if the first permissions comparison result is incomparable or an error result). As also described above, an allow statement set includes all allow statements in the proposed access management policy. For example, as shown in FIG. 4, allow statement set 402 includes all allow statements (allow statements A1-A10) in the proposed access management policy 420. Additionally, a deny statement set includes all deny statements in the proposed access management policy. For example, as shown in FIG. 4, deny statement set 401 includes all deny statements (deny statements D1-D6) in the proposed access management policy 420.

At operation 616, the access management service determines a failing allow statement of a plurality of allow statements of an allow statement set within the proposed access management policy that caused the proposed access management policy to fail the policy validation check, wherein the determining of the failing allow statement is performed based at least in part on one or more modified access management policies each including the deny statement set and only a respective allow statement subset of the allow statement set. As described above, this may be helpful to the customer, such as by pinpointing the cause of the failure, and thereby allowing the customer to quickly delete or modify the statement that caused the failure. As also described above, the determining of the failing allow statement is performed based at least in part on one or more modified access management policies each including the deny statement set and only a respective allow statement subset of the allow statement set. For example, as described above with reference to FIG. 4, as part of determining a failing allow statement, modified policy 420A is formed that includes the deny statement set 401 (including all deny statements D1-D6 from the proposed access management policy 420) and allow statement subset 402A (including only allow statements A1-A5). Also, modified policy 420B includes the deny statement set 401 (including all deny statements D1-D6 from the proposed access management policy 420) and allow statement subset 402C (including only allow statements A6-A7). Also, modified policy 420C includes the deny statement set 401 (including all deny statements D1-D6 from the proposed access management policy 420) and allow statement subset 402E (including only allow statement A6). Some example techniques for determining the failing allow statement are described in greater detail with reference to FIG. 4 and FIG. 7, and these descriptions are not repeated here. In particular, the examples of FIGS. 4 and 7 further explain how modified policies 420A-C may be used to identify the failing allow statement.

At operation 618, the access management service provides an indication of the failing allow statement to the entity. As described above, the indication of the failing allow statement may be included in PVC response 116 of FIG. 1. Some example formats for PVC response 116 are response syntax 202 and response syntax 302, which are described above with reference to FIGS. 2 and 3. For example, the indication of the failing allow statement may be included in the "reasons" array of response syntax 202 and response syntax 302. As described above, the "reasons" array includes information about the reasoning why a check for access passed or failed. In this example, the reasons array includes a "description" string that indicates a description of the reasoning of a result of checking for access. The reasons array includes a "statementId" string that includes an identifier for the reason statement. The reasons array includes a "statementIndex" number that includes the index number of the reason statement. For example, if the proposed policy fails the policy validation check, then the "statementId" string may include an identifier for a statement within the proposed policy that caused the policy to fail the validation check. Additionally, the "statementIndex" number may include the index number for the statement within the proposed policy that caused the policy to fail the validation check. It is noted that, in some examples, there may be more than one allow statement that causes a proposed policy to fail a policy validation check. In these scenarios, there is no requirement that all of these failing allow statements must be reported to the customer. Thus, in some examples, when there are multiple allow statements that cause failure, only of these allow statements may optionally be identified and indicated to the customer. By contrast, in some other examples, when there are multiple allow statements that cause failure, more than one (and in some cases all) of these allow statements may optionally be identified and indicated to the customer.

FIG. 7 is a flowchart illustrating an example failure causation statement identification process that may be used in accordance with the present description. The process shown in FIG. 7 may be an example technique for performing operation 616 of FIG. 6. As shown in FIG. 7, at operation 710, the allow statement set of the proposed access management policy is divided into a plurality of allow statement subsets. As described above, after determining that a proposed policy has failed a validation check, the access management service 100 may identify the statement that caused the failure by dividing the allow statements in the policy and repeating the policy validation check with a modified policy that includes all deny statements but only a subset of allow statements in the initial proposed policy until a single failing allow statement is identified. In one specific example, the allow statements in the proposed policy may be repeatedly divided into two equally sized groups, or approximately equally sized groups. An example of this technique is described in detail above with reference to FIG. 4. In the example of FIG. 4, a proposed policy 420 includes a deny statement set 401 and an allow statement set 402. The deny statement set 401 includes deny statements D1-D6. The allow statement set 402 includes allow statements A1-A10. Thus, the PVC processing components 102 may submit an initial PC request 112 that causes the PC components 103 to compare the proposed policy 420 (including deny statements D1-D6 and allow statements A1-A10) to the relevant security constraints. In this example, the proposed policy 420 has failed a policy validation check, as shown by result 430. Because proposed policy 420 has failed the policy validation check, the access management service 100 may identify a statement in the proposed policy 420 that caused the proposed policy 420 to fail the policy validation check. To identify the statement that caused the failure, the allow statement set 402 may first be divided into allow statement subsets 402A-B. As shown on the right side of FIG. 4, allow statement set 402 (which includes ten allow statements A1-A10) is divided into allow statement subset 402A (including five allow statements A1-A5) and allow statement subset 402B (also including five allow statements A6-A10). In some examples, the allow statement set may be evenly divided into the plurality of allow subsets. The term evenly divided, as used herein, means that each of the plurality of allow statement subsets will have the same quantity of allow statements—or that each of the plurality of allow statement subsets may have only one more, or one less, allow statement than each other of the allow statement subsets (e.g., to allow for dividing an odd number of allow statements into two subsets). For example, in FIG. 4, each of allow statement subsets 402A and 402B have the same quantity of allow statements (e.g., five allow statements). Also, in some examples, the plurality of allow statement subsets may include only two subsets. For example, in FIG. 4, the plurality of allow statement subsets includes only two subsets (e.g., allow statement subsets 402A and 402B).

At operation 712, at least one first additional permissions comparison is performed for at least one of the plurality of allow statement subsets, wherein each of the at least one first additional permissions comparison compares a permissiveness of a respective modified access management policy of the one or more modified access management policies to the one or more security constraints to generate a respective additional permissions comparison result, wherein the respective modified access management policy includes the deny statement set and only the respective allow statement subset included in the plurality of allow statement subsets. For example, as shown in FIG. 4, modified policy 420A may be formed, which includes all of the deny statements D1-D6 in the deny statement set 401 but that includes only the allow statements A1-A5 in the allow statement subset 402A. An additional PC request (e.g., one of PC requests 114A-N of FIG. 1) may then be issued by the PVC processing components 102 to cause the PC components 103 to compare the modified policy 420A (including deny statements D1-D6 and allow statements A1-A5) to the same security constraints to which the proposed policy 420 was compared. In some examples, the at least one first additional permissions comparison may include two or more first additional permissions comparisons that are performed at least partially concurrently with each other (e.g., in parallel). By contrast, in other examples, there may be only one comparison—or the comparisons may be performed one at a time (e.g., serially). As described above, dividing the allow statements into a greater quantity of subsets with fewer statements and performing the comparisons concurrently may reduce the time required to identify the failing allow statement. However, this may also cause more comparisons to be performed, thereby potentially raising costs and increasing request traffic between components.

At operation 714, it is determined, based on the respective additional permissions comparison result for each of the at least one first additional permissions comparison, a failing allow statement subset of the plurality of allow statement subsets that includes the failing allow statement. In the example of FIG. 4, the modified policy 420A passes the policy validation check, as shown by result 430A. This means that the additional permissions comparison result indicates that the modified policy 420A is not more permissive than the security constraints. Because the modified policy 420A passes the policy validation check, it may be concluded that the statement that caused the proposed policy

420 to fail the policy validation check is not one of allow statements A1-A5. Based on this, it may also be concluded that the statement that caused the proposed policy 420 to fail the policy validation check must be one of allow statements A6-A10, which are included in allow statement subset 402B. Thus, in this example, allow statement subset 402B is determined to be the failing allow statement subset.

At operation 716, it is determined whether the failing allow statement subset has only one allow statement. When the failing allow statement subset has only one allow statement, then, at operation 718, the only one allow statement in the failing allow statement subset is selected as the failing allow statement. By contrast, when the failing allow statement subset has more than one allow statement, then the process proceeds to operation 720. In the example of FIG. 4, the failing allow statement subset (e.g., allow statement subset 402B) includes more than one allow statement (e.g., allow statements A6-A10). Thus, in the example of FIG. 4, the process proceeds to operation 720.

At operation 720, the failing allow statement subset is subdivided one or more times and at least one second additional permissions comparison is performed for the deny statement set and a respective allow statement subset of a respective subdivision until a single allow statement is identified that causes failure of the policy validation check, and the single allow statement is selected as the failing allow statement. In the example of FIG. 4, the failing allow statement subset (e.g., allow statement subset 402B) is subdivided into allow statement subsets 402C-D. As shown on the right side of FIG. 4, allow statement subset 402B (which includes five allow statements A6-A10) is divided into allow statement subset 402C (including two allow statements A6-A7) and allow statement subset 402D (including three allow statements A8-A10). A modified policy 420B is then formed, which includes all of the deny statements D1-D6 in the deny statement set 401 but that includes only the allow statements A6-A7 in the allow statement subset 402C. An additional PC request (e.g., one of PC requests 114A-N of FIG. 1) may then be issued by the PVC processing components 102 to cause the PC components 103 to compare the modified policy 420B (including deny statements D1-D6 and allow statements A6-A7) to the same security constraints to which the proposed policy 420 was compared.

In this example, the modified policy 420B fails the policy validation check, as shown by result 430B. This means that the additional permissions comparison result indicates that the modified policy 420B is more permissive than the security constraints—or that the result is uncertain (e.g., incomparable, error result, etc.). Because the modified policy 420B fails the policy validation check, it may be concluded that the statement that caused the proposed policy 420 to fail the policy validation check is within allow statement subset 402C. It is noted, however, that allow statement subset 402C includes more than one allow statement. In view of this, the allow statement subset 402C may be subdivided into allow statement subsets 402E-F. As shown on the right side of FIG. 4, allow statement subset 402C (which includes two allow statements A6-A7) is divided into allow statement subset 402E (including allow statement A6) and allow statement subset 402F (including allow statement A7). A modified policy 420C is then formed, which includes all of the deny statements D1-D6 in the deny statement set 401 but that includes only the allow statement A6 in the allow statement subset 402E. An additional PC request (e.g., one of PC requests 114A-N of FIG. 1) may then be issued by the PVC processing components 102 to cause the PC components 103 to compare the modified policy 420C (including deny statements D1-D6 and allow statement A6) to the same security constraints to which the proposed policy 420 was compared. In this example, the modified policy 420C fails the policy validation check, as shown by result 430C. Because the modified policy 420C fails the policy validation check, it may be concluded that the statement that caused the proposed policy 420 is within allow statement subset 402E. Additionally, because allow statement subset 402E includes only a single allow statement (allow statement A6), it may be concluded that allow statement A6 is the failing allow statement that caused the proposed policy to fail the policy validation check.

Figure 8:
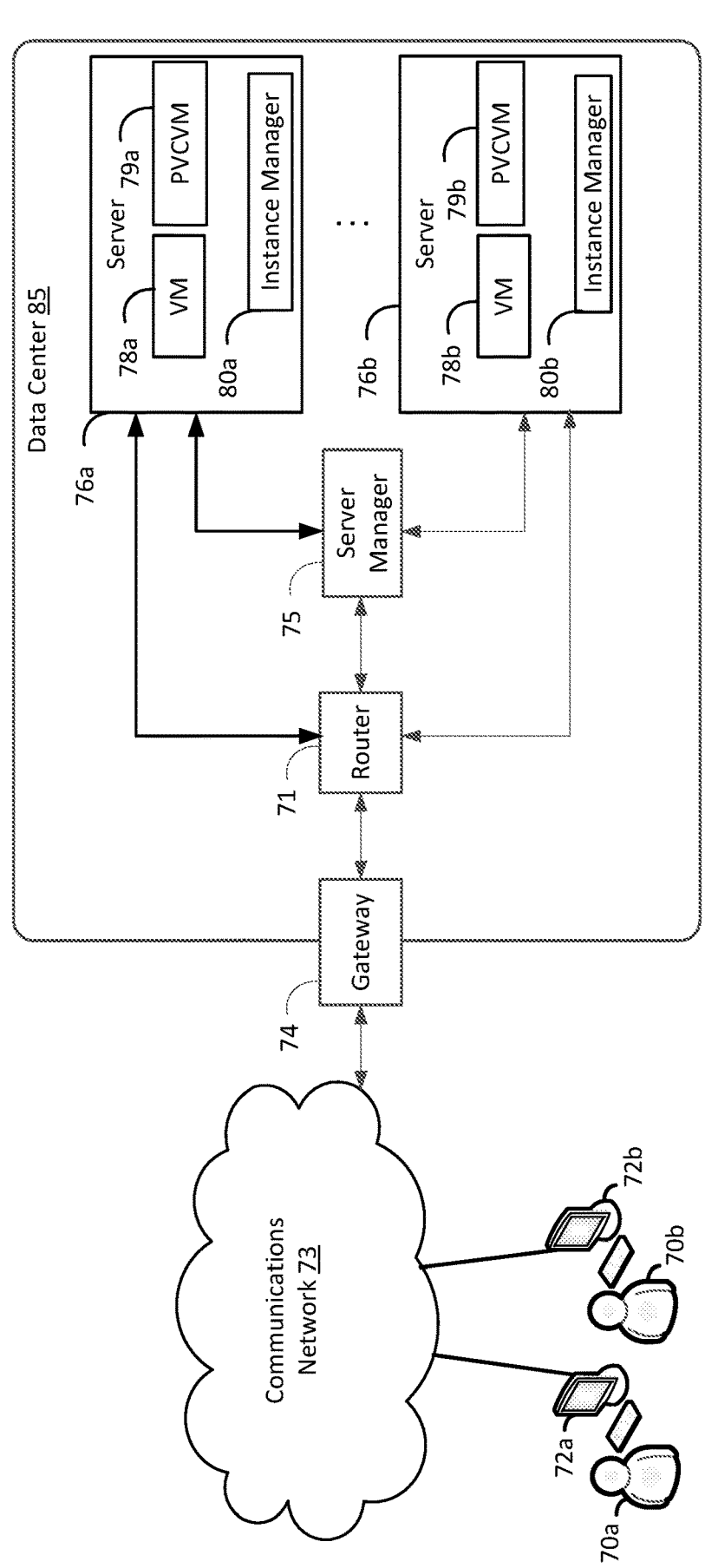
FIG. 8 is a diagram illustrating an example system for transmitting and providing data that may be used in accordance with the present description.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include policy validation check virtual machines (PVCVM's) 79*a-b*, which are virtual machines that are configured to execute any, or all, of the policy validation check processing techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that PCn one or more physical resources, such as a single virtual machine instance with multiple virtual processors that PCn multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
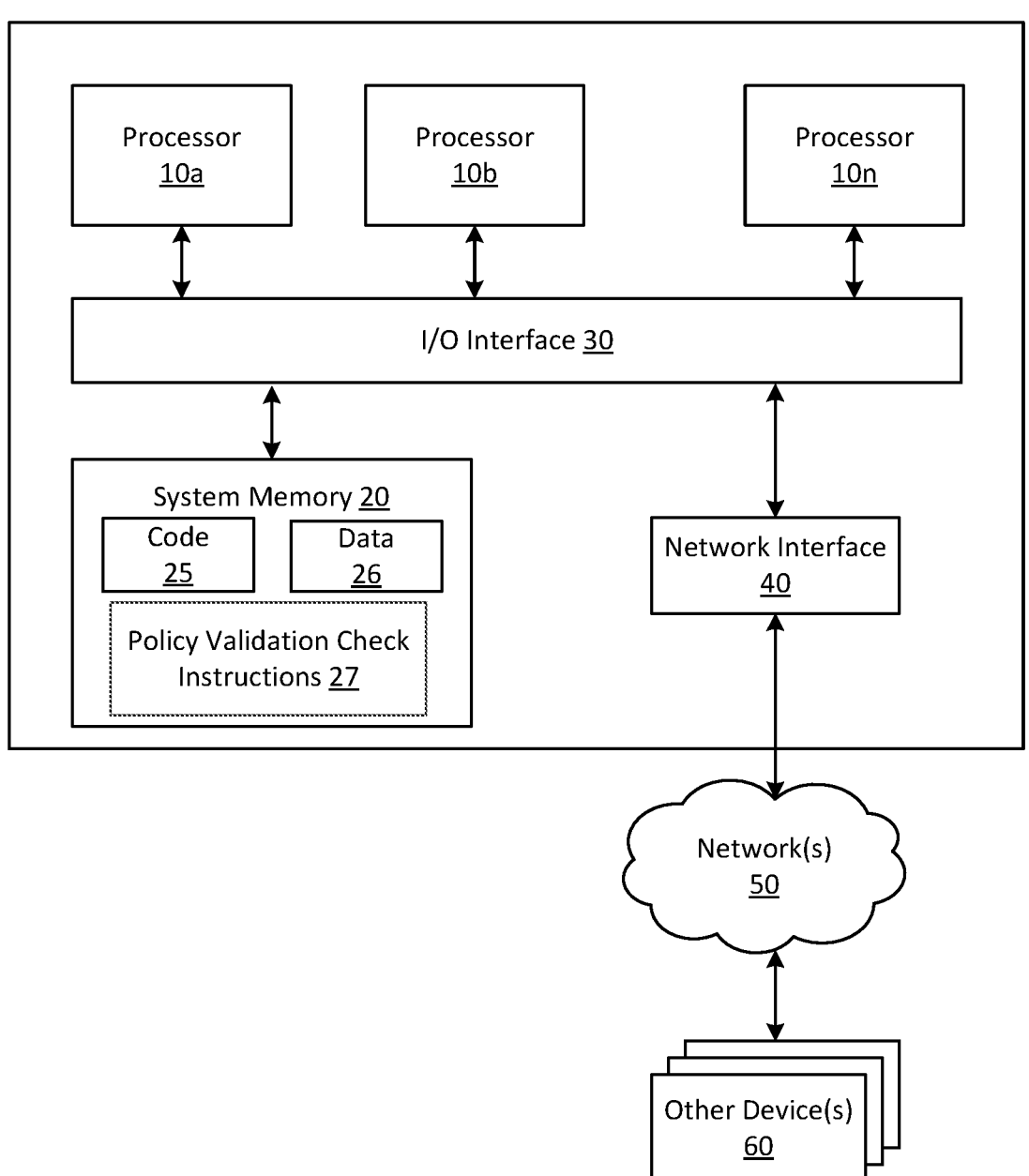
FIG. 9 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, PCRC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes policy validation check instructions 27, which are instructions for executing any, or all, of the policy validation check processing techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform operations comprising:

receiving, by an access management service, from a customer of the access management service, a proposed access management policy and security information indicative of one or more security constraints, wherein the proposed access management policy and the security information are received in association with a customer request for the access management service to perform a policy validation check for validating the proposed access management policy based on the security information, and wherein the security information comprises at least one of a reference policy, a first list of actions that pose a security risk to the customer, a second list of resources, or a maximum quantity of principals that are permitted to access a resource;

performing, by the access management service, a permissions comparison that compares a permissiveness of the proposed access management policy to the one or more security constraints, wherein performing the permissions comparison comprises translating the proposed access management policy and the one or more security constraints into corresponding logical statements, and generating, by a reasoning engine configured to evaluate properties of the logical statements, a permissions comparison result;

generating, by the access management service, based on the permissions comparison result, a binary policy validation check result that is either a first result indicating that the proposed access management policy passed the policy validation check or a second result indicating that the proposed access management policy failed the policy validation check, wherein the binary policy validation check result is a fail when the permissions comparison result indicates that the proposed access management policy and the one or more security constraints are incomparable; and providing, by the access management service, the binary policy validation check result to the customer.

2. The computing system of claim 1, wherein the first result indicating that the proposed access management policy passed the policy validation check is generated based on the permissions comparison result indicating that the proposed access management policy is less permissive than the one or more security constraints or indicating that the proposed access management policy and the one or more security constraints are equally permissive.

3. The computing system of claim 1, wherein the second result indicating that the proposed access management policy failed the policy validation check is generated based on the permissions comparison result indicating that the proposed access management policy is more permissive than the one or more security constraints.

4. The computing system of claim 1, wherein the permissions comparison is performed based on a semantic policy analysis that translates the proposed access management policy and the security constraints into equivalent logical statements and runs satisfiability modulo theories (SMT) to check properties associated with the equivalent logical statements.

5. A computer-implemented method comprising:

receiving, by an access management service, from an entity, a proposed access management policy and security information indicative of one or more security constraints, wherein the proposed access management policy and the security information are received in association with a request for the access management service to perform a policy validation check for validating the proposed access management policy based on the security information;

performing, by the access management service, a permissions comparison that compares a permissiveness of the proposed access management policy to the one or more security constraints, wherein performing the permissions comparison comprises translating the proposed access management policy and the one or more security constraints into corresponding logical statements, and generating, by a reasoning engine configured to evaluate properties of the logical statements, a permissions comparison result;

generating, by the access management service, based on the permissions comparison result, a binary policy validation check result that is either a first result indicating that the proposed access management policy passed the policy validation check or a second result indicating that the proposed access management policy failed the policy validation check, wherein the binary policy validation check result is a fail when the permissions comparison result indicates that the proposed access management policy and the one or more security constraints are incomparable; and providing, by the access management service, the binary policy validation check result to the entity.

6. The computer-implemented method of claim 5, wherein the second result indicating that the proposed access management policy failed the policy validation check is generated based on the permissions comparison result indicating that the proposed access management policy is more permissive than the one or more security constraints.

7. The computer-implemented method of claim 5, wherein the security information and the one or more security constraints comprise a reference policy.

8. The computer-implemented method of claim 5, wherein the security information comprises indications of actions that pose a security risk to the entity.

9. The computer-implemented method of claim 8, wherein the security information comprises indications of resources that store sensitive data.

10. The computer-implemented method of claim 5, wherein the security information comprises a maximum quantity of principals that are permitted to access a resource.

11. The computer-implemented method of claim 5, wherein the permissions comparison is performed based on a semantic policy analysis that translates the proposed access management policy and the security constraints into equivalent logical statements and runs satisfiability modulo theories (SMT) to check properties associated with the equivalent logical statements.

12. The computer-implemented method of claim 5, wherein the first result indicating that the proposed access management policy passed the policy validation check is generated based on the permissions comparison result indicating that the proposed access management policy is less permissive than the one or more security constraints or indicating that the proposed access management policy and the one or more security constraints are equally permissive.

13. One or more non-transitory computer-readable storage media having stored thereon computing instructions that, upon execution by one or more computing devices, cause the one or more computing devices to perform operations comprising:

receiving, by an access management service, from an entity, a proposed access management policy and security information indicative of one or more security constraints, wherein the proposed access management policy and the security information are received in association with a request for the access management service to perform a policy validation check for validating the proposed access management policy based on the security information;

performing, by the access management service, a permissions comparison that compares a permissiveness of the proposed access management policy to the one or more security constraints, wherein performing the permissions comparison comprises translating the proposed access management policy and the one or more security constraints into corresponding logical statements, and generating, by a reasoning engine configured to evaluate properties of the logical statements, a permissions comparison result;

generating, by the access management service, based on the permissions comparison result, a binary policy validation check result that is either a first result indicating that the proposed access management policy passed the policy validation check or a second result indicating that the proposed access management policy failed the policy validation check, wherein the binary policy validation check result is a fail when the permissions comparison result indicates that the proposed access management policy and the one or more security constraints are incomparable; and providing, by the access management service, the binary policy validation check result to the entity.

14. The one or more non-transitory computer-readable storage media of claim 13, wherein the security information comprises a maximum quantity of principals that are permitted to access a resource.

15. The one or more non-transitory computer-readable storage media of claim 13, wherein the first result indicating that the proposed access management policy passed the policy validation check is generated based on the permissions comparison result indicating that the proposed access management policy is less permissive than the one or more security constraints or indicating that the proposed access management policy and the one or more security constraints are equally permissive.

16. The one or more non-transitory computer-readable storage media of claim 13, wherein the security information and the one or more security constraints comprise a reference policy.

17. The one or more non-transitory computer-readable storage media of claim 13, wherein the security information comprises indications of actions that pose a security risk to the entity.

18. The one or more non-transitory computer-readable storage media of claim 17, wherein the operations further comprise:

automatically generating a reference policy based on the indications of the actions, wherein the one or more security constraints comprise the reference policy.

*   *   *   *   *